United States Patent Office 3,433,764
Patented Mar. 18, 1969

3,433,764
ART OF PRODUCING SILOXANE CONDENSATION PRODUCTS
Judith A. Walmsley, Sylvania, Ohio, assignor to Owens-Illinois, Inc., a corporation of Ohio
No Drawing. Filed Oct. 11, 1965, Ser. No. 494,924
U.S. Cl. 260—46.5
Int. Cl. C08g 47/02, 31/02; C07f 7/04
16 Claims

ABSTRACT OF THE DISCLOSURE

Methods of making solvent-soluble, thermoplastic, film-forming organopolysiloxanes by hydrolyzing and partially condensing a hydrolyzable silane that is preferably propyltrialkoxysilane under alkaline conditions to form a prepolymer, and thereafter heating the prepolymer preferably under vacuum to avoid any detrimental action of oxygen and to remove volatile by-product alcohol and low boiling polymeric materials to provide the thermoplastic, organic solvent-soluble organopolysiloxanes. The resulting thermoplastic organopolysiloxanes are useful in coating and film-forming compositions and as plasticizers for other polymers.

---

This invention relates broadly to new and useful condensation products, more particularly siloxane condensation products. Still more particularly it is concerned with organopolysiloxanes which are autogenous siloxane condensation products of the alkaline-catalyzed product of hydrolysis of a particular group of hydrolyzable silanes. Both oily and thermoplastic organopolysiloxanes are provided by the invention. The scope of the invention includes both composition and method features.

The termoplastic organopolysiloxanes of the invention are film-forming. They can be made into self-supporting films, or they can be employed as coating compositions or as components of coating compositions to form protective, decorative and other films that adhere tenaciously to a substrate. In general, they undergo no thermal shock when their temperature is reduced quickly from an elevated temperature, e.g., about 300° C., to ambient temperature. Their thermal stability ranges, for example, from 200°–275° C. depending upon the particular siloxane condensation product. They exhibit strong adherence characteristics to substrates such as glass, metals (e.g., steel, copper, aluminum, tin, etc.) and other solids that are normally coated for decorative, protective, electrically insulating and other purposes. In brief, they have a unique combination of properties heretofore unknown in the organopolysiloxane art.

The oily organopolysiloxanes of the invention are useful, for example, as lubricants, heat-transfer media, hydraulic fluids and in other applications where synthetic fluids are employed. They are not the full equivalent of the thermoplastic organopolysiloxanes of the invention.

Most silanols, i.e., silicon compounds that possess one or more hydroxyl groups bonded to a silicon atom, tend to form the corresponding ether analogs (silioxanes) by an equilibrium reaction which may be envisioned as loss of one molecule of water for each two hydroxyl groups. The reactivity of silanols is so great that high selectivity in product formation is seldom possible, and complexity of the reaction mixture often precludes identification of specific products.

The high reactivity of most silanols makes it desirable to form them in situ. This is usually accomplished by hydrolysis of precursors that contain silicon atoms attached to substituents convertible to hydroxyl groups. These hydrolyses may be illustrated as (I)  $Y_3SiA + H_2O = Y_3SiOH + HA$ (II)  $Y_2SiA_2 + 2H_2O = Y_2Si(OH)_2 + 2HA$ (III)  $YSiA_3 + 3H_2O = YSi(OH)_3 + 3HA$ (IV)  $SiA_4 + 4H_2O = Si(OH)_4 + 4HA$ in which A represents a hydrolyzable group such as alkoxy, acyloxy, halogen, etc., and each Y individually represents any monovalene hydrocarbon or halogenated hydrocarbon radical. The reaction involved in the instant invention falls within the broad category illustrated by Equation III, supra.

It was known prior to the instant invention that siloxane formation is subject to catalysis by an acid or by a base (that is, by effecting the conjoint hydrolysis-condensation reaction under acidic or alkaline conditions); and that pH control is necessary in order to avoid uncontrollable gel formation. Thus, precursors of methylsilanetriol, e.g., compounds of the type $YSiA_3$, supra, were known to exhibit the fastest and least controllable rate of hydrolysis-condensation. Although the problem was more acute when hydrolyzable silanes were employed that liberate acidic by-products during hydrolysis, it was known that the alkoxysilanes are also subject to gel formation. For example, according to M. M. Sprung and F. O. Guenther, J. Am. Chem. Soc. 77,3990 (1955), "The usual total hydrolysis product of methyltrialkoxysilane or methyltrihalosilane, so-called 'T-gel,' has the empirical formula $(CH_3SiO_{1.5})_n$. It is a granular, insoluble, infusible, and generally intractable solid."

U.S. Patent No. 2,465,188, Barry et al. describes the preparation of alkylsilsesquioxanes by the destructive distillation, preferably in the presence of an alkali-metal hydroxide, of an alkylsilsesquioxane hydrolysate. This hydrolysate of Barry et al. "is the hydrolysis product of a silane of the formula $RSiX_3$, where R is an alkyl radical containing from 2 to 6, inclusive, carbon atoms and X is . . . an alkoxy group or a halogen atom." There is no teaching or suggestion of carrying out this initial conjoint hydrolysis and condensation reaction under alkaline conditions, and all three examples show that it is carried out under acidic conditions. (The examples show only the hydrolysis of ethyl-, propyl- and butyltrichlorosilanes; and, therefore, HCl is introduced into the reaction medium as the reaction proceeds.) The destructive distillation of the aforementioned hydrolysate provides an overhead fraction comprising a mixture of low-molecular-weight alkylsilsesquioxane polymers having an average of from 8 to 24 silicon atoms per molecule, and which can be separated into their components by known means.

British patent specification No. 992,193 (complete specification published May 19, 1965) discloses the conjoint hydrolysis and condensation, under alkaline conditions (i.e., pH above 7), of methyltrimethoxy- and/or methyltriethoxysilane using a water-soluble alkaline substance having a basic dissociation constant $K_b$ which is at least $1.8 \times 10^{-5}$ at 25° C., e.g., the alkali-metal hydroxides and phosphates. The product is a siloxane consisting essentially of units of the formula $CH_2SiO_{3/2}$, having a bulk density of less than 0.6 per ml., and which is useful in making alkali-metal siloxanolates.

It is a primary object of the present invention to provide a new class of organopolysiloxanes that embraces both thermoplastic and oily siloxane condensation products. The thermoplastic organopolysiloxanes of the invention, especially the preferred ones, have high thermal stability, do not undergo thermal shock when cooled from about 300° C. to room (i.e., ambient) temperature by bringing them directly from the higher temperature to the lower temperature, and can be formed or converted into films (including self-supporting films) and coatings that are not brittle.

A further object of the invention is to provide new oily organopolysiloxanes.

Another object of the invention is to provide films or coating compositions that will adhere tenaciously to substrates, e.g., glass surfaces and the like, and which are clear and transparent (colorless) when deposited either from a solution or a melt.

Still another object of the invention is to provide a relatively simple and economical procedure or method for making the organopolysiloxanes of this invention.

Other objects of the invention will be apparent to those skilled in the art from the following more detailed description and from the appended claims.

Broadly described, the foregoing objects are attained by preparing a siloxane condensation product of the alkaline-catalyzed product of a hydrolysis of a hydrolyzable silane represented by the general formula (I) 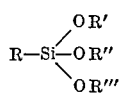

wherein R represents an alkyl radical containing from 3 to 5 carbon atoms, inclusive, and R′, R″ and R‴ each represents an alkyl radical containing from 1 through 3 carbon atoms, which radicals may be the same or different. Preferably R represents a propyl radical (still more preferably the n-propyl radical), and R′, R″ and R‴ each represents a methyl radical. When R represents a propyl radical, and R′, R″ and R‴ each represents a methyl radical, the formula for the hydrolyzable silane (i.e., a propyltrimethoxysilane) is (II) 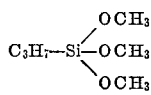

When R represents a propyl or a butyl radical, solid or semi-solid, thermoplastic organopolysiloxanes are obtained; but when R represents an amyl radical, then the siloxane condensation products or polymers are oils.

Examples of hydrolyzable silanes embraced by Formula I are listed below:

n-Propyltrimethoxy-, -triethoxy-, and -tripropoxysilanes
Isopropyltrimethoxy-, -triethoxy-, and -tripropoxysilanes
n-Butyltrimethoxy-, triethoxy-, and -tripropoxysilanes
Isobutyltrimethoxy-, -triethoxy-, and -tripropoxysilanes
sec.-Butyltrimethoxy-, -triethoxy-, and -tripropoxysilanes
tert.-Butyltrimethoxy-, -triethoxy-, and -tripropoxysilanes;

the various normal and isometric amyltrimethoxy-, -triethoxy-, and tripropoxysilanes; and the monomethoxydiethoxysilanes, monoethoxydimethoxysilanes, and other unsymmetrical or "mixed" trialkoxysilanes (containing from 1 through 3 carbon atoms in the alkoxy grouping) that correspond to the aforementioned symmetrical trialkoxysilanes.

A more detailed description of the preparation of the organopolysiloxanes of this invention follows:

An organopolysiloxane prepolymer is first prepared by conjointly hydrolyzing and condensing, to form a siloxane partial condensation product, a hydrolyzable silane of the kind embraced by Formula I. This reaction is effected under alkaline conditions, i.e., at a pH above 7.0, more particularly at a pH of at least 9, preferably from 10 to 14, and still more preferably at a pH of about 12–13.

Theoretically any compound that will provide an alkaline (basic) solution should be effective as a catalyst in promoting the siloxane condensation reaction. Practically, however, some basic or basic-forming materials are much less satisfactory or less effective than others, requiring longer reaction periods, or special "work-up" procedures in isolating the product, or special techniques or a different added basic catalyst in polymerizing the prepolymer, or yielding a different type or a less useful product than that which is desired for the usual commercial applications. For example, ammonium hydroxide, aqueous solutions of normally gaseous amines, e.g., monoethylamine, and low-boiling basic compounds such as dimethylamine and monoethylamine have the objection that much of it may be lost by volatilization when the conjoint hydrolysis and condensation reaction is effected by the preferred technique of heating the alkaline-catalyzed reaction mass under reflux.

Certain basic compounds can be used satisfactorily in preparing the prepolymer but require the addition of a different base in converting the prepolymer to the desired polymer. For instance, tetramethylammonium hydroxide can be employed satisfactorily in the initial condensation reaction to yield the prepolymer but cannot be converted to the polymer by the preferred procedure (i.e., heating the prepolymer under vacuum) unless a different catalyst, more particularly an inorganic base and specifically potassium hydroxide, is added during the vacuum treatment. Other quaternary ammonium and phosphonium hydroxides will behave similarly because they all decompose below 300° C. Among such quaternary ammonium hydroxides may be additionally mentioned, for example, tetraethanolammonium hydroxide, benzyltrimethylammonium hydroxide and benzyltriethylammonium hydroxide.

For reasons such as have been indicated in the two preceding paragraphs it is preferred to use as the basic catalytic material a hydroxide, carbonate or bicarbonate of an alkali metal having an atomic number above 3. The basic catalyst is preferably introduced as such into the reaction mixture but it is not essential that this be done since it may be formed in situ. Alkali-metal alkoxides may be employed, e.g., sodium, potassium, rubidium and cesium methoxides, ethoxides, n-propoxides and tert.· butoxides.

A catalytic amount of the basic or basic-forming reagent is present in the reaction mass both for the initial conjoint hydrolysis and condensation reaction and during the subsequent heat-treatment of the siloxane partial condensation product or prepolymer. An additional amount of the same catalyst or a different catalyst may be incorporated into the prepolymer, as desired or as conditions may require, prior to the aforementioned heat-treatment.

The amount of the catalytic base that is added to the initial reaction mixture is sufficient to effect an autogenous condensatio nof the hydrolyzable silane, e.g., a concentration of said base equivalent to a KOH concentration not less than $1.0 \times 10^{-4}$ M (i.e., molar). Thus, using KOH at a concentration of $1.0 \times 10^{-2}$ M, one obtains a solid prepolymer.

The reaction of the trialkoxysilane with water in the presence of a base may be carried out in the presence or absence of an organic solvent, e.g., a lower alkanol, and specifically methanol. Methanol has been found to be the most satisfactory solvent regardless of the alkoxy groups in the silane. However, other alcohols, such as ethyl, propyl, isopropyl alcohols or higher members of the homologous series, may be used if desired. Other organic solvents that may be employed are water- and/or alcohol-soluble solvents that will form a single-phase system upon initial admixture of the various ingredients, e.g., acetone.

The conjoint hydrolysis and condensation reaction is effected at an elevated temperature, usually at the refluxing temperature of the reaction mass. The time of the reaction under reflux conditions may vary considerably, e.g., from 1 to 120 hours, but generally the desired prepolymer is obtained after a reaction period under refluxing conditions of from 2 to 96 hours.

The resulting siloxane partial condensation product or prepolymer is isolated by any suitable means. For example, a solid siloxane prepolymer may be separated by suction filtration, washed thoroughly with a solvent in which it is insoluble, and in which water and the base are soluble, e.g., methanol, and dried in air and/or under heat until substantially all the methanol has been evolved. Thus, a combination of air-drying followed by drying in a vacuum oven at 20°–50° C. for from 2 to 4 hours or longer advantageously may be employed.

The solid prepolymer obtained as above described is then heated to a temperature not substantially exceeding its melting point in order to advance its condensation to the desired film-forming organopolysiloxane. For example, a prepolymer obtained by conjoint hydrolysis and condensation of a propyltrimethoxysilane, specifically n-propyltrimethoxysilane, may be heated (preferably under vacuum) to its melting temperature of about 300° C. in order to advance its condensation to the desired film-forming organopolysiloxane. Heating under vacuum removes oxygen that causes or tends to cause decomposition of the heated polymer at such high temperatures; and, also, aids in the removal of volatile, low-molecular-weight materials from the melt. In the case of oily condensation products, vacuum treatment under heat is carried out at a temperature and for a period of time sufficient to remove at least the excess and/or by-product alcohol and to remove any low-boiling polymeric material.

Instead of carrying out the above-described heat-treatment of the prepolymer under vacuum, as is preferred, it may be effected in an atmosphere of an inert gas, e.g., nitrogen, argon, helium, etc., thereby avoiding any detrimental action of oxygen upon the polymeric material while it is being heated. However, heat-treatment under vacuum has the previously-mentioned additional advantage of removing volatile, low-molecular-material from the melt.

After heating in this manner, the polymer is then cooled, also preferably under vacuum, to ambient temperature. Cooling under vacuum may be effected at approximately the same reduced pressure used in heating the solid organopolysiloxane to its melting temperature thereby to obviate or minimize discoloration of the product. The vacuum applied during the aforementioned heating and cooling steps may correspond to, for example, 1 or 2 mm. Hg, or lower or higher, as desired or as the particular conditions may require.

Advantageously, the solid, film-forming organopolysiloxanes of this invention are made by a method which includes the step of preparing a prepolymer that is a product of conjoint hydrolysis and condensation of a propyltrimethoxysilane (i.e., n-propyl- or isopropyltrimethoxysliane, and preferably the n-propyl derivative) to form a siloxane partial condensation product, by heating at the reflux temperature of the reaction mass a solution containing the following ingredients in the stated molar ratios:

| | Molar ratio |
|---|---|
| A propyltrimethoxysilane | 1.0 |
| Water | 2.0 to 24.0 |
| Hydroxide, carbonate or bicarbonate of an alkali metal having an atomic number above 3 | 0.01 to 0.3 |
| Methanol | 0 to 100 |

Preferably the solution that is heated under reflux conditions contains the following ingredients in the stated molar ratios:

| | Molar ratio |
|---|---|
| n-Propyltrimethoxysilane | 1.0 |
| Water | 3.0 to 16.0 |
| Potassium hydroxide | 0.05 to 0.2 |
| Methanol | 0.0 to 50.0 |

Specifically, the solution is heated under reflux at the boiling temperature of the reaction mass contains the following ingredients in the stated molar ratios:

| | Molar ratio |
|---|---|
| n-Propyltrimethoxysilane | 1.0 |
| Water | About 8.0 |
| Potassium hydroxide | About 0.1 |
| Methanol | 0 to 20 |

The prepolymers (i.e., siloxane partial condensation products) and final polymers of this invention vary from oils to semi-solids and solids. For example, a prepolymer derived from n-butyltrimethoxysilane was found to be a sticky, white solid. Prepolymers derived from a propyltrimethoxysilane, specifically n-propyltrimethoxysilane, vary, depending, for example, upon the particular amount of methanol or other organic solvent (if any) employed, from clear, colorless, solid, resinous materials to white, waxy solids; while in some cases the prepolymer is a mixture of such solid resins and waxy solids. The prepolymers and polymers derived from an amyltrialkoxysilane, specifically n-amyltriethoxysilane, are oils.

A film made from the final polymer derived from n-propyltrimethoxysilane softens at about 250° C. and decomposes in air at about 250°–300° C. It is clear and colorless even after heating at 250° C., and does not thermal shock. Heating does not cause its embrittlement. It adheres strongly to glass surfaces and other substrates. Since this polymer softens and flow at elevated temperatures, it can be compression-molded.

The molecular weights of polymers of this invention are high as compared with the prior-art polymers in the same general area. For example, polymers having number average molecular weights ($\overline{M}_N$) of about 10,000 and even approximately 13,000 have been obtained by practicing this invention. This was wholly unobvious and in no way could have been predicted.

It is essential in carrying the present invention into effect that the first step of the reaction (i.e., the formation of prepolymer) be effected under alkaline conditions of reaction. This first step involves the hydrolysis of the trialkoxysilane to the corresponding silanol and rapid self-condensation (i.e., autogenous condensation) to the siloxane. Variations in the R group that is bonded directly to Si (see Formula I) cause unobvious and unpredictable variations in the characteristics of the prepolymers and polymers that are obtained. The solid prepolymers are believed to have a fairly ordered structure with perhaps some cross-linking. The prepolymer is an almost completely hydrolyzed and condensed siloxane, which contains a small amount of silanolate end groups.

The heat-treatment, preferably under vacuum, is believed to effect a thermal rearrangement of the prepolymer molecules. This rearrangement is catalyzed by the aforementioned silanolate end groups and/or by small amounts of basic catalyst which may have become physically incorporated in the prepolymer. From Nmr, IR, molecular weight and solubility data, it is believed that the final polymer has a linear, double-chain structure.

In order that those skilled in the art may better understand how the present invention can be carried into effect, the following examples are given by way of illustration and not by way of limitation. All parts and percentages are by weight unless otherwise stated.

Example 1

Fifty (50) ml. of methanol, 18.0 g. of distilled water (1 mole) and 0.7 g. (0.0125 mole) of KOH in pellet form are added, with stirring, to 20.5 g. (0.125 mole) of n-propyltrimethoxysilane (90–100% pure). The catalyst is added last. The resulting solution is initially clear or slightly cloudy, but a precipitate rapidly forms when heating is begun. The mixture is brought to reflux temperature and heated under reflux, with stirring, for 2 hours.

At the end of the reflux period the solid siloxane prepolymer is isolated by any suitable means, e.g., by suction filtration. After washing thoroughly with a solvent, specifically methanol, it is air-dried. The remainder of the methanol is removed by drying in vacuum oven at 20°–50° C. for at least 2 hours. The product is a white, waxy solid. Yield: 11–13 g.; M.P. 280°–300° C.

If the prepolymer is caked in the form of large lumps at the end of the drying period, it is usually pulverized, rewashed with methanol and again dried as above described.

Examples 2–5

Example 1 is repeated using the same quantities of n-propyltrimethoxysilane, water and KOH and the same general procedure as in that example, but using either different reaction periods and/or either no added methanol or larger amounts of methanol. The differences and the appearance of the prepolymer are tabulated below:

| Example No. | Amount of methanol (ml.) | Reaction time (hrs.) | Appearance of prepolymer |
| --- | --- | --- | --- |
| 2 | None | 2 | White, waxy solid. |
| 3 | 100 | 4 | Mixture of white waxy, solid and clear, colorless resin. |
| 4 | 250 | 72–120 | Clear, colorless resin. |
| 5 | 500 | 120 | Do. |

Example 6

Same as in Example 1 with the exception that 1.88 g. (0.0125 mole) of cesium hydroxide is employed instead of 0.7 g. of KOH. The prepolymer product is a white, brittle, waxy solid melting at 270°–290° C.; mol. wt. ($\overline{M}_N$) after vacuum treatment, approximately 13,000.

Example 7

Same as in Example 1 with the exception that 22.3 g. (0.125 mole) of n-butyltrimethoxysilane is used in place of 20.5 g. of n-propyltrimethoxysilane. The prepolymer product is a sticky, white solid. Yield, 14.0 g.

Instead of using 0.7 g. of KOH as in Examples 1–5 and 7, one may substitute an approximately equivalent amount of other basic catalysts, e.g., 9.1 g. of potassium hydrogen carbonate or 12.5 g. of anhydrous potassium carbonate.

Example 8

The prepolymer of Example 1 is heated under a reduced pressure of 1 mm. Hg to 300° C. at which temperature it melts. After cooling to room temperature under approximately the same reduced pressure, the resulting resinous, substantially completely condensed organopolysiloxane ($\overline{M}_N$ of approximately 10,000–13,000) is dissolved in an organic solvent, specifically benzene, to form a solution containing about 40% by weight of organopolysiloxane solids. (A small amount of acetic acid may be added to the solution to neutralize residual catalyst. However, better adhesion to substrates is obtained if neutralization is not effected.) The solution is filtered to remove insoluble material. The filtered solution may be used as a coating composition. For example, it can be poured on a substrate such as a glass plate and the benzene solvent allowed to evaporate in air at room temperature. A clear, colorless film that adheres tenaciously to the glass substrate is obtained. It is still clear and colorless when reheated to 250° C.

Alternatively, the polymer can be precipitated from the benzene solution by pouring the said solution very slowly into a large volume of vigorously stirred methanol. The white, fibrous polymer that precipitates is separated by, for instance, suction filtration, washed with methanol, and dried at ambient temperature in a vacuum oven. Yield, 60%.

Instead of using benzene as a solvent for the film-forming organopolysiloxane, one may use other organic solvents, e.g., other aromatic hydrocarbons such as toluene, xylene and the like; aliphatic hydrocarbons including, for instance, heptane, octane, nonane, and mixtures thereof; polar solvents such as tetrahydrofuran, chlorinated hydrocarbons, etc.

In a manner similar to that described under Example 1, the prepolymers of Examples 2–7 are converted to polymers by heating under vacuum to and at the melting point of the individual polymer.

Example 9

A portion of the prepolymer of Example 1 is pulverized to a fine powder, which is then placed on a glass plate. The plate with its deposited layer of polymer thereon is heated in air to 300° C. At this temperature the powder melts and forms a continuous, tenaciously adhering film on the plate. This film is slightly cloudy.

The films deposited from a solution or from a melt as described in Examples 8 and 9 are resistant to thermal shock. This is shown by heating a film to 300° C. in an oven, maintaining it at this temperature for 15 minutes, and removing it from the oven at 300° C. directly to room temperature.

Example 10

Same as in Example 1 with the exception that 0.5 g. NaOH is used instead of 0.7 g. of KOH. The prepolymer product is a solid that melts at 320° C. in the absence of air. When heat-treated under vacuum in a manner similar to that described under Example 8 in order to convert it to the final polymer, the temperature must be increased to 320°–325° C. so that it will melt.

Example 11

Example 1 is repeated substituting 50 ml. acetone for 50 ml. methanol. The M.P. is 285°–290° C.; yield, 11.2 g.

Example 12

Same as in Example 1 with the exception that 1.3 g. (0.0125 mole) of rubidium hydroxide is substituted for the same molar amount of KOH. The final polymer has a melting point of 291° C.; yield ,12.4 g.

Example 13

This example illustrates the preparation of an unsupported (i.e., self-supporting) film from a final polymer of the invention.

A 1% solution of hydroxyethyl cellulose in water is poured onto a glass plate and allowed to dry to a film. A benzene solution of an n-propylsiloxane polymer produced as described in Example 8 is poured on top of the cellulose film and allowed to dry in air. When it is dry, the entire glass plate is immersed in water. The film of hydroxyethylcellulose dissolves in the water, while the film of n-propylsiloxane polymer floats free. It is dried at 20°–50° C., yielding a clear, colorless film. Drying is preferably effected under vacuum.

Example 14

This example illustrates the use of an organic base in forming the prepolymer and an inorganic base in converting the prepolymer to the final polymer.

A reaction mixture is prepared as in Example 1 from the following ingredients:

n-Propyltrimethoxysilane (0.125 mole) _____g__ 20.5
Methanol _____ml__ 50
Water _____ml__ 18
Tetramethylammonium hydroxide
  $(CH_3)_4NOH \cdot 5H_2O$ (0.0128 mole) _____g__ 1.5

The resulting solution is refluxed for two hours. The white, chunky prepolymer that forms is separated by suction filtration, washed with methanol and dried in a vacuum oven as described in Example 1. It does not melt, but evolves amine above 130° C.

The above-described prepolymer cannot be converted to the polymer by a vacuum treatment unless an additional catalyst is used. Five ml. of a methanolic-KOH solution, containing $2.5 \times 10^{-2}$ g. of potassium hydroxide, is added to 4.0 grams of the above-described n-propylsiloxane prepolymer. The mixture is heated to 300° C. under vacuum in a vacuum-sublimation apparatus until it has completely melted. After cooling to ambient temperature under vacuum, the residue is dissolved in benzene and isolated according to the procedure given in Example 8.

Example 15

This example illustrates the use of an amyltriethoxysilane in practicing the present invention.

A reaction mixture is prepared as in Example 1 from the following ingredients:

| | |
|---|---|
| n-Amyltriethoxysilane (vacuum distilled) (0.125 mole) ml | 33 |
| Water (1 mole) ml | 18 |
| KOH pellets (0.0125 mole) g | 0.7 |
| Methanol ml | 100 |

The resulting solution is refluxed for 7 hours. At the end of this time there are two phases present in the system, viz., a viscous, oily layer and a cloudy solution. The oily layer is separated from the solution and transferred to a 100-ml. flask fitted with a vacuum take-off. The oil is slowly heated to 200° C. under vacuum and held at this temperature for 30 minutes, during which time all volatile materials are removed. On cooling to ambient temperature under vacuum, a viscous oil is obtained. Infrared and Nmr analyses show that it is analgous to the polymers from propyl- and butyltrialkoxysilanes, but is of lower molecular weight.

From the foregoing description it will be seen that the organopolysiloxanes of this invention are obtainable in liquid, semi-solid or solid form depending, for example, upon the particular starting hydrolyzable silane employed, the degree of siloxane condensation that is effected, the amount of by-product alkanol and/or added alkanol that is allowed to remain in the reaction mass, and other influencing factors.

The solid polymers of this invention can be molded into a wide variety of useful articles for domestic and industrial uses, or for decorative purposes. The liquid polymeric products of the invention can be used as plasticizers for the solid polymers of the invention or for other polymers. As indicated by certain of the examples, solutions or melts of the organopolysiloxanes of the invention are useful as surface-coating compositions. In such applications they may be used, if desired, in the form of admixtures with other resins or other additives commonly employed in surface coatings.

The organopolysiloxanes of the present invention are also useful as plasticizers, as flow-promoters (e.g., during molding), or for otherwise modifying a wide variety of condensation and addition polymers, natural gums and resins, natural and synthetic rubbers or elastomers, including various polyvinyl and polyacrylic resins, epoxy resins, urea-formaldehyde resins, melamine-formaldehyde resins, phenol-formaldehyde resins, alkyd resins, polyester resins, etc.

Dyes, pigments, opacifiers, inhibitors, lubricants, fillers such as cellulose in floc, filament or other form, metal fibers, silica, iron oxide, alumina, asbestos, etc., and other conventional additives to coating and molding compositions can be incorporated into the siloxane condensation polymers of this invention, or into blends with other natural and synthetic polymers, as desired or as the particular application conditions may require and in accordance with conventional practice.

From the foregoing it will be evident that modifications of this invention can be made withotu departing from the spirit and scope of this disclosure or from the scope of the following claims.

I claim:

1. A method of making an organic solvent-soluble, thermoplastic, film-forming organopolysiloxane, without gelation, the method comprising the steps of (A) preparing a prepolymer by conjointly hydrolyzing and condensing, to form a siloxane partial condensation product, a hydrolyzable silane represented by the general formula

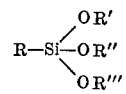

wherein R represents an alkyl radical containing from 3 to 5 carbon atoms, inclusive, and R', R", and R''' each represents an alkyl radical containing from 1 through 3 carbon atoms, the conjoint hydrolysis and partial condensation reaction being effected at a pH of above 7.0; and (B) heating the prepolymer of step A in an inert atmosphere to avoid the detrimental action of oxygen on the prepolymer and to remove by-product alcohol and low molecular weight material to form an organic solvent-soluble, thermoplastic film-forming organopolysiloxane.

2. A method as defined in claim 1 in which in step B the prepolymer is heated under vacuum to remove by-product alcohol and low boiling material therefrom and to advance its condensation to the desired organic solvent-soluble thermoplastic organopolysiloxane.

3. A method as defined in claim 1 in which the conjoint hydrolysis and partial condensation reaction is effected at a pH of at least 9 that results from the presence of a catalytic amount of an alkaline material selected from the group of an alkali metal hydroxide, alkali metal carbonate or alkali metal bicarbonate, the alkali metal having an atomic number above 3.

4. A method as defined in claim 3 in which the conjoint hydrolysis and partial condensation reaction is effected at a pH within the range from about 10 to 14.

5. A method as defined in claim 1 in which the hydrolyzable silane is propyltrimethoxysilane which is hydrolyzed and partially condensed according to the following formulation:

| | Molar ratio |
|---|---|
| Propyltrimethoxysilane | 1.0 |
| Water | 2.0 to 24.0 |
| Hydroxide, carbonate or bicarbonate of an alkali metal having an atomic number above 3 | 0.01 to 0.3 |
| Methanol | 0 to 100 |

6. A method as defined in claim 1 in which the hydrolyzable silane is conjointly hydrolyzed and partially condensed according to the following formulation:

| Ingredients: | Molar ratio |
|---|---|
| n-Propyltrimethoxysilane | 1.0 |
| Water | 3.0 to 16.0 |
| Potassium hydroxide | 0.05 to 0.2 |
| Methanol | 0 to 50 |

7. A method as defined in claim 1 in which the hydrolyzable silane is conjointly hydrolyzed and partially condensed according to the following formulation:

| Ingredients: | Molar ratio |
|---|---|
| n-Propyltrimethoxysilane | 1.0 |
| Water | about 8.0 |
| Potassium hydroxide | about 0.1 |
| Methanol | 0 to 20 |

8. A method as defined in claim 1 in which the hydrolyzable silane is n-propyltrimethoxysilane and the prepolymer of step A is heated in step B under vacuum to its melting temperature of about 300° C. in order to advance its condensation to the desired thermoplastic, organic solvent-soluble, film-forming organopolysiloxane.

9. An organic solvent-soluble, thermoplastic, film-forming organopolysiloxane prepared according to the method defined in claim 1.

10. A coating composition comprising an organic solvent having dissolved therein the organic solvent-soluble, thermoplastic organopolysiloxane resulting from the method of claim 1.

11. A coating composition as defined in claim 1 in which the hydrolyzable silane is n-propyltrimethoxysilane.

12. A film-forming composition comprising a thermoplastic, organic solvent-soluble organopolysiloxane resulting from the method of claim 1, the organopolysiloxane being dissolved in an organic solvent.

13. An organic solvent-soluble, thermoplastic organopolysiloxane resulting from the method of claim 1, in which the hydrolyzable silane is propyltrimethoxysilane and the organopolysiloxane is a solid at room temperature.

14. A method as defined in claim 2 in which the prepolymer is heated at a pressure of 1 mm Hg.

15. A method as defined in claim 1 in which the prepolymer is heated in an atmosphere of an inert gas.

16. A method as defined in claim 15 in which the gas is nitrogen.

References Cited

UNITED STATES PATENTS

| 2,465,188 | 3/1949 | Barry et al. | 260—448.2 |
| 3,000,858 | 9/1961 | Brown | 260—46.5 |
| 3,208,972 | 9/1965 | Lyons | 260—46.5 |
| 3,257,330 | 6/1966 | Burzynski et al. | 260—46.5 |
| 3,334,065 | 8/1967 | Lewis et al. | 260—46.5 |
| 3,354,095 | 11/1967 | Burzynski et al. | 260—46.5 |

OTHER REFERENCES

Sprung et al.: The Partial Hydrolysis of Methyl Triethoxysilane and The Partial Hydrolysis of Ethyltriethoxysilane, Journal of the American Chemical Society, vol. 77, pp. 3990 to 4002 (1955).

DONALD E. CZAJA, *Primary Examiner.*

M. J. MARQUIS, *Assistant Examiner.*

U.S. Cl. X.R.

117—124, 135.1; 252—63.7; 260—30.4, 33.6, 33.8, 37, 448.8, 824, 826, 827, 828